（12） United States Patent
Ishimoto et al.

(10) Patent No.: US 8,654,509 B2
(45) Date of Patent: Feb. 18, 2014

(54) ELECTRODE FOIL, PROCESS FOR PRODUCING SAME, AND CAPACITOR USING ELECTRODE FOIL

(75) Inventors: Hitoshi Ishimoto, Hyogo (JP); Masashi Shoji, Kyoto (JP)

(73) Assignee: Panasonic Corporation, Osaka (JP)

( * ) Notice: Subject to any disclaimer, the term of this patent is extended or adjusted under 35 U.S.C. 154(b) by 116 days.

(21) Appl. No.: 13/497,027

(22) PCT Filed: Feb. 7, 2011

(86) PCT No.: PCT/JP2011/000659
§ 371 (c)(1),
(2), (4) Date: Mar. 19, 2012

(87) PCT Pub. No.: WO2011/099260
PCT Pub. Date: Aug. 18, 2011

(65) Prior Publication Data
US 2012/0176727 A1 Jul. 12, 2012

(30) Foreign Application Priority Data

Feb. 15, 2010 (JP) ................................. 2010-029766
May 26, 2010 (JP) ................................. 2010-120025

(51) Int. Cl.
*H01G 9/00* (2006.01)
(52) U.S. Cl.
USPC ........... 361/503; 361/502; 361/504; 361/516; 361/519; 361/525

(58) Field of Classification Search
USPC ......... 361/502, 503, 504, 508–512, 516–519, 361/523–525, 528–529
See application file for complete search history.

(56) References Cited

U.S. PATENT DOCUMENTS 7,115,929 B2 * 10/2006 Bhat et al. ................. 257/296
2010/0202102 A1 8/2010 Aoyama et al.

FOREIGN PATENT DOCUMENTS

| JP | 2007-305776 A | 11/2007 |
| JP | 2008-258404 A | 10/2008 |
| JP | 2009-079275 A | 4/2009 |
| JP | 2009-135431 A | 6/2009 |
| WO | WO 02/067278 A2 | 8/2002 |
| WO | WO 2006/117985 A1 | 11/2006 |

OTHER PUBLICATIONS

International Search Report issued in International Patent Application No. PCT/JP2011/000659, dated Apr. 26, 2011.

* cited by examiner

*Primary Examiner* — Nguyen T Ha
(74) *Attorney, Agent, or Firm* — McDermott Will & Emery LLP

(57) ABSTRACT

An electrode-foil includes a foil having a metal layer on the surface thereof, a first dielectric film formed on the metal layer, and a second dielectric film formed on the first dielectric film. The first dielectric film is composed of a metal oxide of a metal constituting the metal layer. The thickness of the first dielectric film is greater than 0 nm and less than 10 nm. The second dielectric film is predominantly composed of a metal compound different from the metal oxide of the first dielectric film.

10 Claims, 6 Drawing Sheets

ELECTRODE FOIL, PROCESS FOR PRODUCING SAME, AND CAPACITOR USING ELECTRODE FOIL

RELATED APPLICATIONS

This application is the U.S. National Phase under 35 U.S.C. §371 of International Application No. PCT/JP2011/000659, filed on Feb. 7, 2011, which in turn claims the benefit of Japanese Application No. 2010-029766, filed on Feb. 15, 2010, and Japanese Application No. 2010-120025, filed on May 26, 2010, the disclosures of which are incorporated by reference herein.

TECHNICAL FIELD

The present invention relates to an electrode-foil, a manufacturing method for the electrode-foil, and a capacitor including the electrode-foil.

BACKGROUND ART

Capacitors include a solid electrolytic capacitor having a low equivalent series resistance (ESR), and an aluminum electrolytic capacitor having a high withstand voltage. The solid electrolytic capacitor is used around the central processing unit (CPU) of a personal computer. The aluminum electrolytic capacitor is used for the inverter power supply for a large machine, and the inverter power supply for an automobile, such as a hybrid vehicle. There is a strong demand that these capacitors have smaller sizes and larger capacities.

In a conventional solid electrolytic capacitor, for example, an electrode-foil is used as the positive electrode. The electrode-foil includes a foil whose surface is roughened by etching or vapor deposition, and a dielectric film of an oxide film formed on the surface of the foil (see Patent Literature 1 and 2, for example).

In the conventional electrode-foil, the dielectric film is formed by anodizing the foil. That is, since the dielectric film is made of an oxide of a metal constituting the foil, the dielectric constant and withstand voltage are affected by the materials of the foil. Thus, the conventional electrode-foil has a low degree of flexibility in increasing the dielectric constant or reducing the film thickness. This poses a limitation on the increase in the capacity of the capacitor.

CITATION LIST

Patent Literature

PTL1: Japanese Patent Unexamined Publication No. 2008-258404
PTL2: Japanese Patent Unexamined Publication No. 2009-79275

SUMMARY OF THE INVENTION

The present invention is directed to provide an electrode-foil used for a capacitor having a large capacity, a manufacturing method for the electrode-foil, and a capacitor including the electrode-foil.

The electrode-foil includes a foil having a metal layer on the surface thereof; a first dielectric film formed on the metal layer, and a second dielectric film formed on the first dielectric film. The first dielectric film is composed of a metal oxide of a metal constituting the metal layer. The thickness of the first dielectric film is greater than 0 nm and less than 10 nm. The second dielectric film is predominantly composed of a metal compound different from the metal oxide of the first dielectric film.

In the thus configured electrode-foil, the first dielectric film is formed thin such that the thickness thereof is less than 10 nm. The second dielectric film is capable of increasing the dielectric constant of the whole dielectric film, or decreasing the thickness of the whole dielectric film easily. As a result, the thus configured electrode-foil can increase the capacity of the capacitor.

DESCRIPTION OF EMBODIMENTS

First Exemplary Embodiment

Hereinafter, a description is provided for an electrode-foil and a capacitor including the electrode-foil in accordance with a first exemplary embodiment of the present invention. The capacitor of this exemplary embodiment is a solid electrolytic capacitor including a conductive polymer material as an electrolyte.

Figure 1:
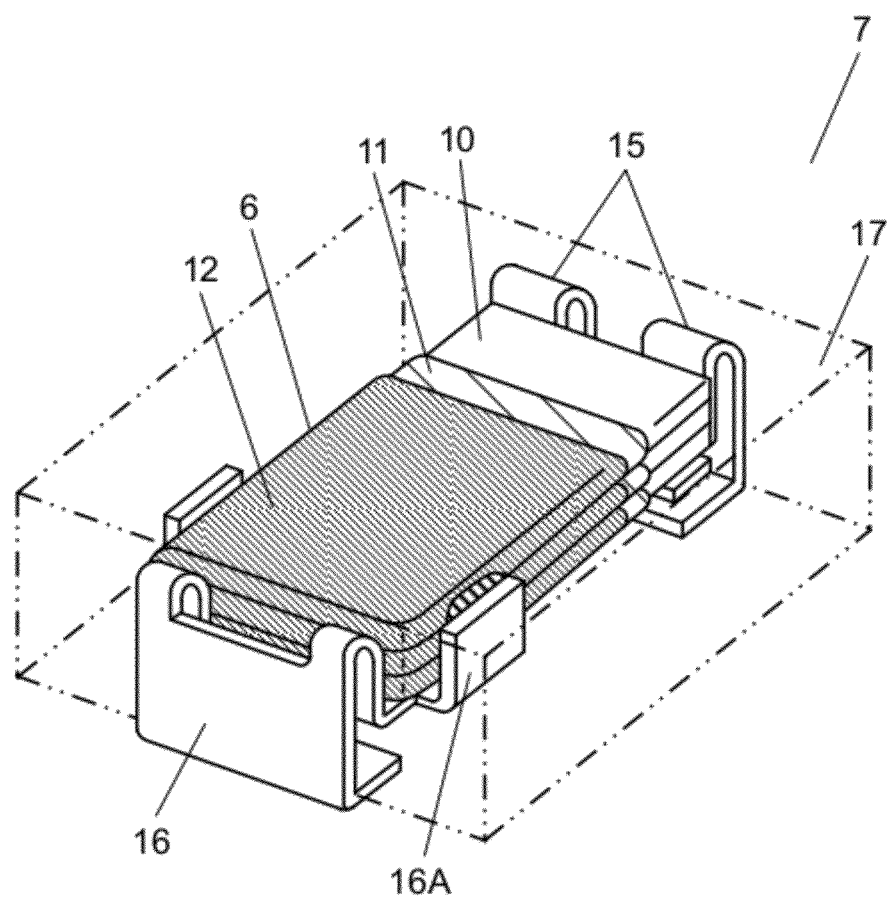
FIG. 1 is a perspective view of a capacitor in accordance with a first exemplary embodiment of the present invention.
Figure 2A:
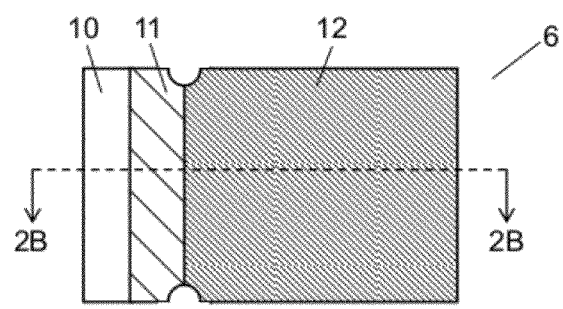
FIG. 2A is a plan view of a capacitor element used in the capacitor of FIG. 1.
Figure 2B:
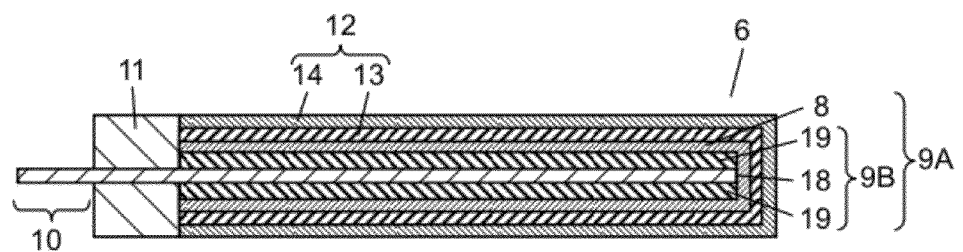
FIG. 2B is a sectional view of the capacitor element of FIG. 2A.

FIG. 1 is a perspective view of capacitor 7 formed by laminating capacitor elements 6, in accordance with this exemplary embodiment. FIG. 2A is a plan view of capacitor element 6, and FIG. 2B is a sectional view of capacitor element 6 taken on line 2B-2B.

As shown in FIG. 2A, planar capacitor element 6 has positive electrode part 10, insulating resist part (separation part) 11, and negative electrode part 12. As shown in FIG. 2B, electrode-foil 9A having dielectric film 8 formed on the surface is used as a positive electrode-foil. That is, electrode-foil 9A includes foil 9B and dielectric film 8 formed on rough film layer 19 of foil 9B. Further, foil 9B is formed of substrate 18 and rough film layer 19 formed on substrate 18.

Resist part 11 is formed on electrode-foil 9A, and separates electrode-foil 9A into positive electrode part 10 and a negative electrode forming part (not shown). Positive electrode part 10 is a part where substrate 18 of electrode-foil 9A is exposed. Negative electrode part 12 is formed on dielectric film 8 in the negative electrode forming part. Negative electrode part 12 is formed of the following layers: solid electrolyte layer 13 made of a conductive polymer that is formed on dielectric film 8; and negative electrode layer 14 formed of a carbon layer on solid electrolyte layer 13 and a silver paste layer.

As shown in FIG. 1, capacitor 7 includes a plurality of capacitor elements 6, positive electrode terminal 15, negative electrode terminal 16, and outer package 17. Capacitor elements 6 are laminated with each other. Positive electrode parts 10 are connected to positive electrode terminal 15 by laser welding. The bottom face or side faces of negative electrode parts 12 are connected to negative electrode terminal 16. Specifically, negative electrode terminal 16 has bends 16A that are formed by upwardly bending both side parts of the negative electrode terminal adjacent to the part on which capacitor elements 6 are mounted. The capacitor element mounting part of negative electrode terminal 16 and negative electrode part 12 of capacitor element 6 in the lowermost position are bonded with a conductive adhesive. Similarly, the conductive adhesive is also used between bends 16A and negative electrode parts 12, and between negative electrode parts 12 of vertically adjacent two of capacitor elements 6 so as to bond these parts.

Outer package 17 made of an insulating resin covers positive electrode terminal 15 and negative electrode terminal 16 integrally with capacitor elements 6 such that a part of each of the terminals is exposed to the external surface of outer package 17. The part of positive electrode terminal 15 and the part of negative electrode terminal 16 exposed from outer package 17 are bent toward the bottom face along outer package 17. This processing provides surface mount type capacitor 7 including a positive electrode terminal and a negative electrode terminal on the bottom face.

Figure 3A:
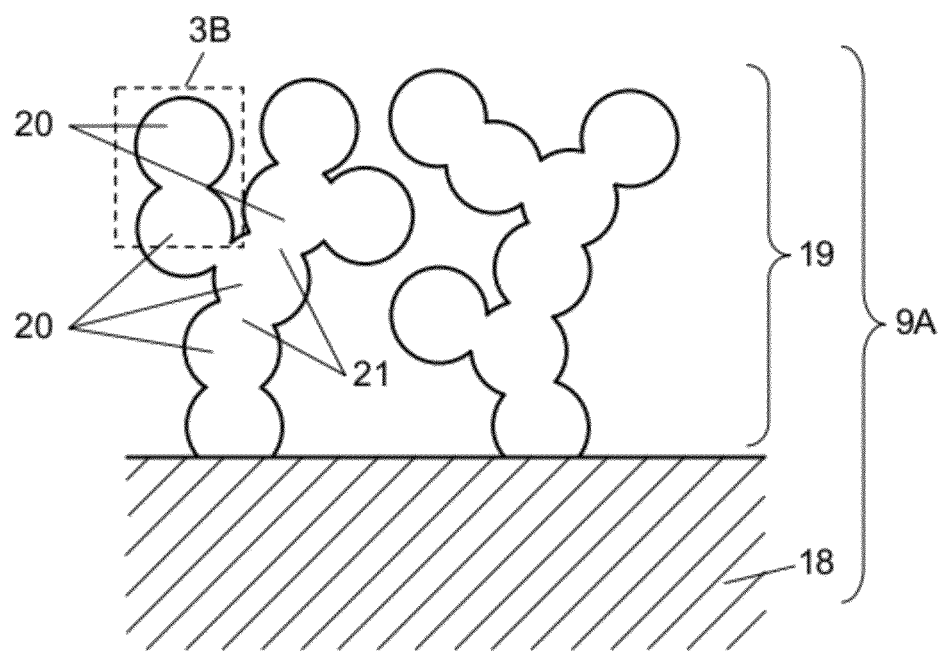
FIG. 3A is a schematic sectional view showing a structure of an electrode-foil in accordance with the first exemplary embodiment.
Figure 3B:
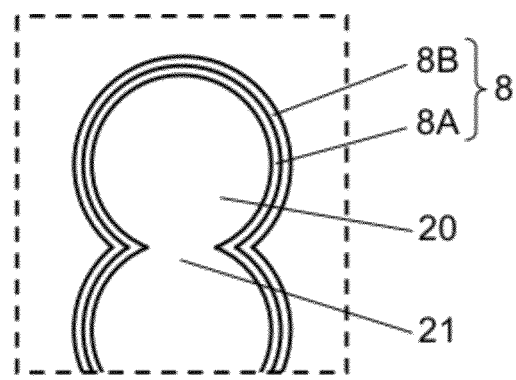
FIG. 3B is an enlarged sectional view of part 3B in FIG. 3A.
Figure 4A:
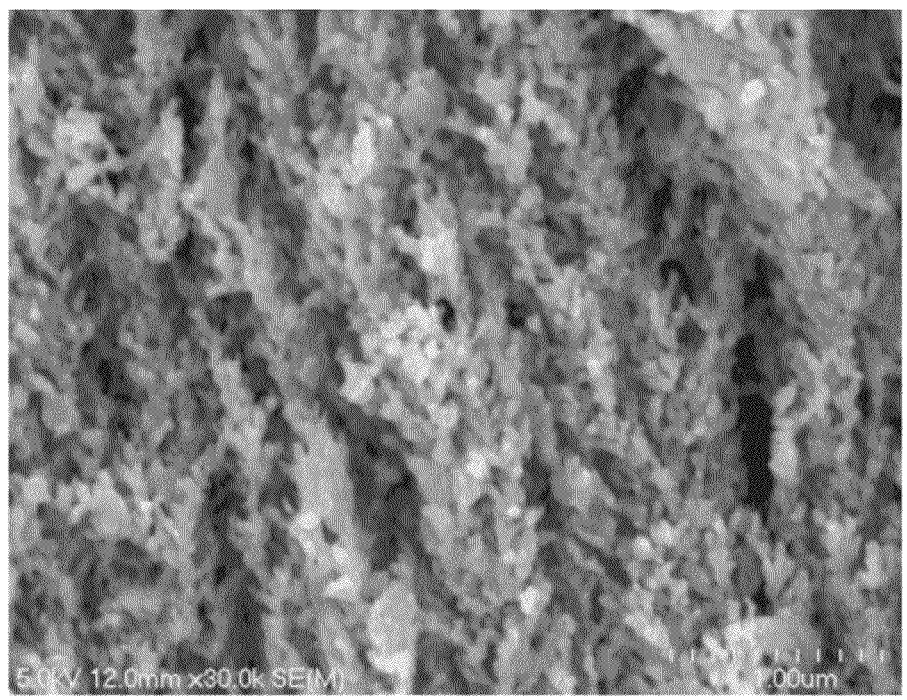
FIG. 4A is a scanning electron microscopy (SEM) image showing the electrode-foil of FIG. 3A magnified by 30000 times.
Figure 4B:
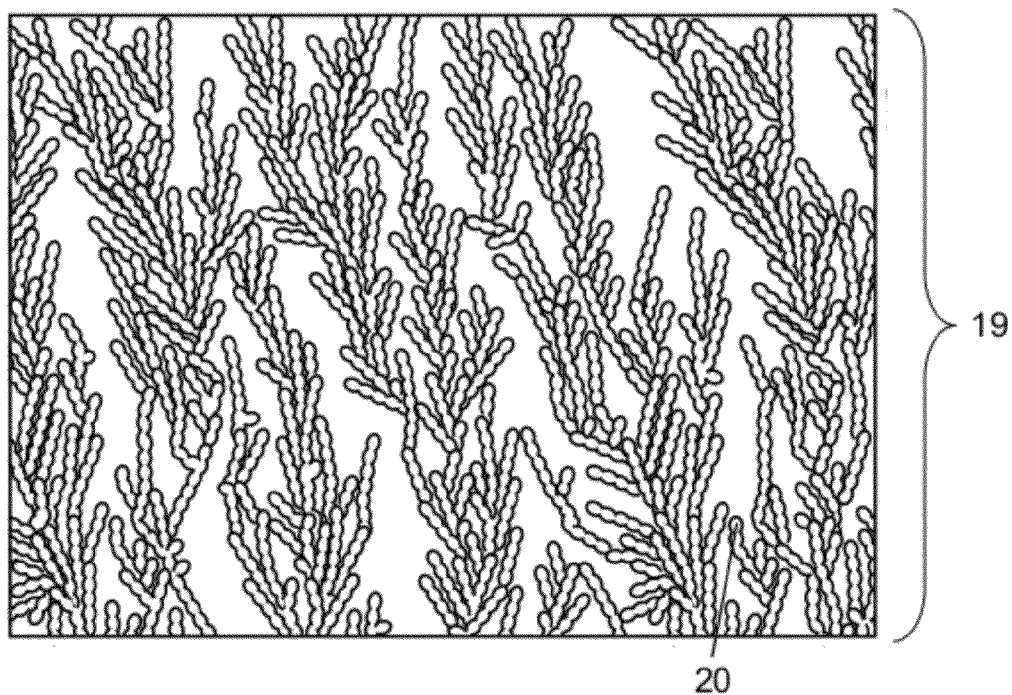
FIG. 4B is a schematic diagram of FIG. 4A.

Next, with reference to FIG. 3A through FIG. 4B, electrode-foil 9A is detailed. FIG. 3A is a schematic sectional view of electrode-foil 9A. FIG. 3B is an enlarged sectional view of part 3B of FIG. 3A. FIG. 4A shows a scanning electron microscopy (SEM) image of electrode-foil 9A of FIG. 3A magnified by 30000 times. FIG. 4B is a schematic diagram of FIG. 4A.

As shown in FIG. 3A, FIG. 4A, and FIG. 4B, rough film layer 19 is formed of a structure where a plurality of metallic fine particles 20 irregularly are connected together and extends from the surface of substrate 18 and forms a plurality of branches. Further, a large number of holes are present inside rough film layer 19. Because these holes lead to the exterior, these holes increase the surface area of rough film layer 19.

Metallic fine particles 20 may have a substantially equal diameter, or metallic fine particles 20 having different diameters may be piled up randomly so as to form rough film layer 19. Alternatively, the diameter of metallic fine particle 20 in the base portion may be increased, and the diameter of metallic fine particle 20 in the tip portion may be decreased. This configuration can enhance the adhesion between metallic fine particles 20 and substrate 18, maintain the large surface area, and increase the capacity. In this exemplary embodiment, an aluminum foil is used as substrate 18, and metallic fine particles 20 are predominantly composed of aluminum.

As shown in FIG. 3B, dielectric film 8 is laminated on the outer surface of metallic fine particles 20 along the surface shape of metallic fine particles 20. Dielectric film 8 is made of a laminate of first dielectric film 8A and second dielectric film 8B formed on first dielectric film 8A. Connection part 21 between metallic fine particles 20 is constricted, and first dielectric film 8A and second dielectric film 8B are also formed on the outer surface of constricted connection part 21.

First dielectric film 8A is composed of aluminum oxide, i.e. an oxide of metallic fine particles 20. Second dielectric film 8B is predominantly composed of a metal compound different from the oxide of first dielectric film 8A. Second dielectric film 8B is made of titanium dioxide, for example, which has a dielectric constant greater than that of first dielectric film 8A. This configuration can enhance the capacity of the capacitor with the same thickness as a whole in comparison with the case where dielectric film 8 is formed only of first dielectric film 8A made of aluminum oxide.

First dielectric film 8A has a thickness greater than 0 nm and less than 10 nm. It is preferable that second dielectric film 8B is thicker than first dielectric film 8A. Thus, thin first dielectric film 8A can be reinforced. Further, because the capacity of the capacitor can be substantially increased by second dielectric film 8B, it is preferable that first dielectric film 8A is as thin as possible. Specifically, a thickness less than 10 nm is sufficient. First dielectric film 8A serves to connect metallic fine particles 20 to second dielectric film 8B, e.g. enhances adhesion between metallic fine particles 20 and second dielectric film 8B.

Metallic fine particles 20 may be made of valve metals, e.g. aluminum alloys, titanium, niobium, and tantalum, besides aluminum. However, metallic fine particles 20 (rough film layer 19) made of aluminum, which has a relatively low melting point, can provide high productivity in forming rough film layer 19 by vapor deposition.

Substrate 18 may be made of metallic materials, e.g. aluminum alloys, tantalum and titanium, besides aluminum. A film made of a conductive polymer, or a transparent conductive glass may also be used.

The main component of rough film layer 19 formed of metallic fine particles 20 may differ from that of substrate 18. However, when the same metal is used, substrate 18 is adequately softened by the heat in vapor deposition and this enhances the bond to metallic fine particles 20 while the shape of substrate 18 is maintained.

Some of metallic fine particles 20 may be made of metal compounds, such as a metal oxide and a metal nitride. Further, a part of each metallic fine particle 20 may be made of metal compounds, such as a metal oxide and a metal nitride.

Second dielectric film 8B is made of titanium dioxide, which has a high dielectric constant. Besides this material, second dielectric film 8B may be made of a material predominantly composed of a metal compound different from that of first dielectric film 8A. Such materials include chemical compounds, such as oxides and nitrides of various metals including valve metals, e.g. zirconium, silicon, tantalum, and niobium. The dielectric constant of second dielectric film 8B may be lower than that of first dielectric film 8A. In this case, if second dielectric film 8B is made of a metal compound that can be formed into a thin film, such as silicon dioxide, the thickness of dielectric film 8 can be reduced, which contributes to the increase in the capacity of the whole capacitor.

Hereinafter, a description is provided for an example of a manufacturing method for electrode-foil 9A.

(1) Substrate 18 is placed in a vapor deposition chamber and the inside of the chamber is kept at a vacuum of 0.01 to 0.001 Pa. Substrate 18 is made of a high-purity aluminum foil, i.e. a valve action metal foil, having a thickness of 50 μm.

(2) An inert gas is fed to the periphery of substrate 18 such that the flow rate of argon gas with respect to that of oxygen gas is two to six times. Thereby, the pressure on the periphery of substrate 18 is kept at 10 to 30 Pa.

(3) The temperature of substrate 18 is kept in the range of 150° C. to 300° C.

(4) Rough film layer 19 is formed by vacuum vapor deposition while aluminum is disposed as the vapor deposition source.

It is preferable that the average particle diameter of metallic fine particles 20 in rough film layer 19 ranges from 0.01 μm to 0.30 μm inclusive. That is, preferably, the conditions for vacuum vapor deposition are set such that the average particle diameter of metallic fine particles 20 falls within the above range. Specifically, when the conditions for the partial pressure of each introduction gas, the film-forming pressure, the substrate temperature, or the like are properly set, the average particle diameter of metallic fine particles 20 can fall within the above range.

In this exemplary embodiment, metallic fine particles 20 having an average diameter of approximately 0.10 μm are used. With an average particle diameter less than 0.01 μm, connection part 21 of metallic fine particles 20 is extremely thin and has a low mechanical strength in some cases. With an average particle diameter exceeding 0.30 μm, increasing the surface area is difficult. In order to maintain the mechanical strength, it is preferable that the diameter of connection part 21 is at least 30% of the diameter of metallic fine particle 20.

Further, it is preferable that the mode of the diameters of the holes in rough film layer 19 ranges from 0.01 μm to 0.20 μm inclusive. Making the holes in rough film layer 19 extremely fine in this manner can increase the surface area. This mode is extremely smaller than the mode of the diameters of the holes in an electrode-foil roughened by general etching. Such a state can be achieved by forming rough film layer 19 by vacuum vapor deposition as described above. The diameter of a hole in rough film layer 19 can be obtained by a method of mercury penetration, using Expression (1).

$$D = -4\gamma \cos \theta / P \quad (1)$$

In this expression, P is a pressure applied to fill the holes with mercury, D is the diameter of a hole, $\gamma$ is the surface tension of mercury (480 dyne·cm$^{-1}$), and $\theta$ is a contact angle between the mercury and the pore wall surface. The mode of the diameters of the holes is the peak value of the distribution of the diameter D of a hole.

In this exemplary embodiment, the porosity of rough film layer 19 ranges from approximately 50% to 80%. The porosity can be obtained by conversion of the weight of rough film layer 19 and the density of the vapor deposition material.

As shown in FIG. 3A, metallic fine particles 20 bond with each other in rough film layer 19. Thus, in the section in the vertical direction (piling direction), a large number of connection parts 21 are present between metallic fine particles 20. This can hinder the measurement of the diameters of individual particles. In that case, the image-processing of SEM images of metallic fine particles 20 in the horizontal section facilitates the measurement of the average particle diameter of metallic fine particles 20.

In the above step (2), vapor deposition is performed while an oxygen gas and an argon gas are fed. This operation can form first dielectric film 8A on the surface of metallic fine particle 20 while forming rough film layer 19 simultaneously. However, in step (2), vapor deposition may be performed while neither the oxygen gas nor the argon gas is fed. In this case, after rough film layer 19 has been formed, first dielectric film 8A can be formed by natural oxidation, for example.

First dielectric film 8A can be formed by anodization, for example, before second dielectric film 8B is formed. When first dielectric film 8A is formed by oxidation of metallic fine particles 20, first dielectric film 8A is formed so as to erode the inside of metallic fine particles 20, and also on the outer surfaces of metallic fine particles 20. Second dielectric film 8B is not formed by oxidation, and thus is formed only on the outer surface of first dielectric film 8A.

As described above, in this exemplary embodiment, metallic fine particles 20 are connected together and extend from substrate 18 toward the surface layer so as to form rough film layer 19 made of a structure including a plurality of branches. Further, since rough film layer 19 has a structure including a plurality of branches, rough film layer 19 has a high impregnating ability of an electrolytic solution or polymers which is a solid electrolyte, for example in a case where the electrode-foil is used in a capacitor.

The thickness of rough film layer 19 on each side ranges from 20 μm to 80 μm inclusive. Rough film layers 19 are formed on both sides of substrate 18. Rough film layer 19 may be formed on only one side. The thickness of rough film layer 19 equal to or greater than 20 μm enables capacitor 7 to have a large capacity. When the thickness is equal to or less than 80 μm, the above vapor deposition process can control the thickness of rough film layer 19 accurately. In this exemplary embodiment, vapor deposition is shown as an example of the process for forming rough film layer 19. As long as a coarse (porous) structure can be formed such that metallic fine particles 20 are connected together with gaps formed between metallic fine particles 20, methods other than vapor deposition, such as aerosol and sputtering, may be used.

Next, a description is provided for a forming method for dielectric film 8. Herein, a description is provided for an example where second dielectric film 8B is made of titanium dioxide. A mixed solution containing 0.05M of $(NH_4)_2TiF_6$ and 0.1M of ammonium nitrate $(NH_4NO_3)$ is prepared. At this time, additive agents, such as a pH regulator and a reducing agent, can be added to this solution as appropriate. The thus prepared solution is kept at a temperature of 15° C. or lower, e.g. at 5° C. Foil 9B is immersed in the solution.

Next, the electric potential of foil 9B is kept constant, using an electrochemical measurement device. At this time, Ag/AgCl is used for a reference electrode, and carbon or platinum is used for a counter electrode. The thickness of second dielectric film 8B is adjusted as appropriate based on the electric potential and electrolysis time. By reducing the thickness of second dielectric film 8B, the capacitance of electrode-foil 9A can be increased. For instance, when the electric potential of foil 9B is set between −1.0V and −1.5V and electrolysis is performed with quantity of electricity of 0.001 C/cm$^2$ to 5 C/cm$^2$, dielectric film 8 with excellent quality can be formed.

The concentrations of various reagents to be mixed are selected as appropriate because the concentrations affect the reaction speed and film thickness. In this exemplary embodiment, a metal compound made of a fluoro complex is used as the source of titanium, which is a row material of second dielectric film 8B. However, any material may be used as long as the material can provide metal ions (titanium ions) in a stable manner. In this exemplary embodiment, ammonium nitrate is dissolved. This is intended to control the pH of the interface, and other nitric acid compounds may be used. The similar advantage can be obtained by adjusting the amount of oxygen dissolved in the solution as appropriate, without the use of ammonium nitrate. Alternatively, other additive agents can be used for this purpose. As the solvent in the solution, an organic solvent can be used instead of water.

In this exemplary embodiment, second dielectric film 8B is formed by an electrolytic method for electrolysis using an external power supply. Besides this method, second dielectric film 8B may be formed without electrolysis by adding a deoxidizer, such as dimethylamine borane, to a solution that contains a metal compound such as $(NH_4)_2TiF_6$, and a nitric acid-based compound such as $NH_4NO_3$. That is, second dielectric film 8B can be formed by an electroless method in which foil 9B is immersed in the solution after keeping the temperature of the solution containing the above deoxidizer constant. At this time, the film-forming speed can be controlled by adjusting the concentrations of the nitric acid-based compound and the deoxidizer as appropriate. The thickness of second dielectric film 8B can be adjusted by controlling the immersion time. Also in the electroless method, it is preferable to keep the solution at a low temperature (equal to or lower than 15° C.).

When second dielectric film 8B is formed by the above electrolysis method or electroless method, and thereafter heat treatment is performed as needed, the quality of dielectric film 8 is enhanced. The heat treatment at a temperature ranging from 150° C. to 600° C. can easily provide a film with high quality.

When second dielectric film 8B is formed of zirconia oxide, $(NH_4)_2ZrF_6$ is prepared in place of $(NH_4)_2TiF_6$ as a metal compound. When a compound of an element that can be the material of second dielectric film 8B other than titanium, e.g. zirconium, silicon, tantalum, niobium, lanthanum, and germanium, is dissolved in the solution, second dielectric film 8B can be formed of various materials. When a silicon compound is dissolved, second dielectric film 8B having a relatively low dielectric constant but a high withstand voltage can be formed.

With the above process, second dielectric film 8B having a thickness ranging from approximately 5 nm to 100 nm can be formed. When the temperature of the solution in which foil 9B is immersed exceeds 15° C., first dielectric film 8A grows in the thickness direction and has a thickness equal to or greater than 10 nm. In contrast, in this exemplary embodiment, the solution in which foil 9B is immersed is kept at a low temperature in the electrolysis method or the electroless method. Thereby, the thickness of first dielectric film 8A formed under second dielectric film 8B can be suppressed to a value greater than 0 nm and less than 10 nm. When the temperature of the solution in which foil 9B is immersed is too low, the solution solidifies. Thus, it is preferable to adjust the temperature of the solution to the range of −5° C. to 15° C. inclusive.

Figure 5A:
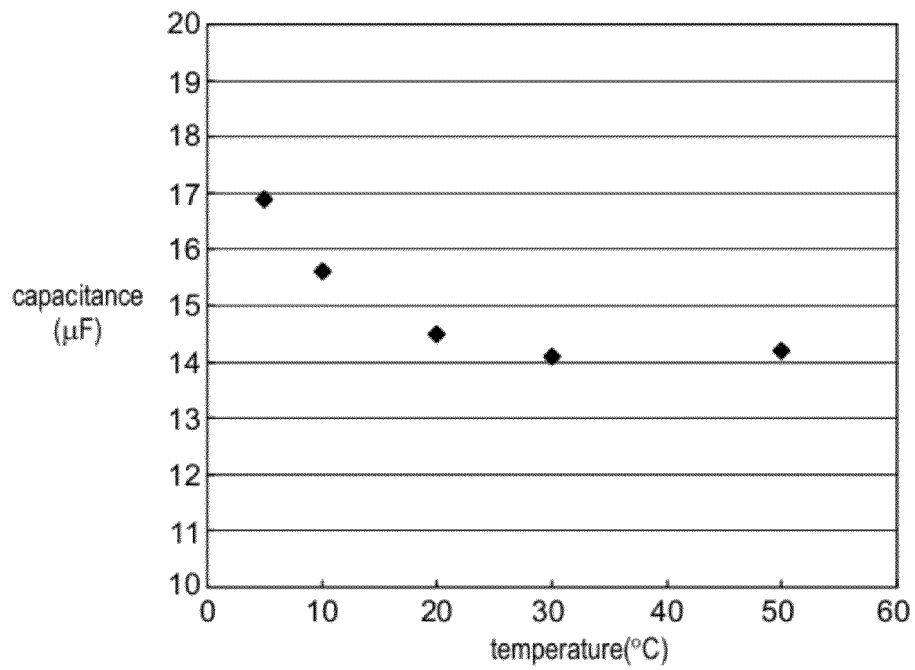
FIG. 5A is a graph showing the relation between a temperature of a metal plating solution and a capacitance of the electrode-foil in accordance with the first exemplary embodiment of the present invention.
Figure 5B:
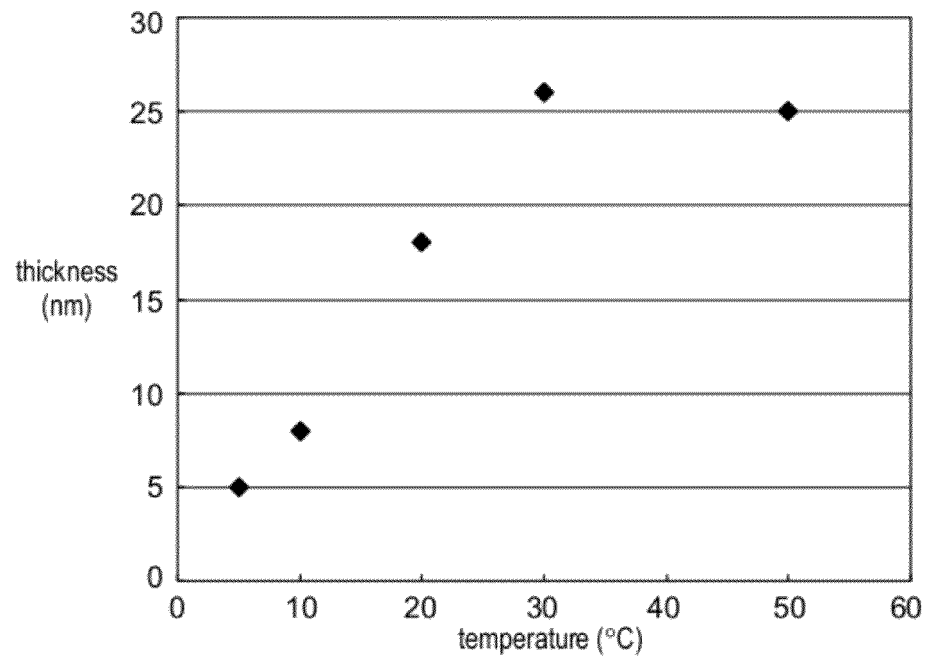
FIG. 5B is a graph showing the relation between the temperature of the metal plating solution and a thickness of a first dielectric film in accordance with the first exemplary embodiment.

FIG. 5A shows the relation between a temperature of a metal plating solution and a capacitance (capacity) of completed electrode-foil 9A when second dielectric film 8B made of $TiO_2$ is formed on an aluminum plane foil having a size of 1 cm×2 cm. Generally, in an aluminum plane foil, an oxide film corresponding to first dielectric film 8A is formed by natural oxidation. As obvious from FIG. 5A, the capacitance is larger in the range equal to or lower than 15° C. FIG. 5B shows the relation between the temperature of the metal plating solution and the thickness of first dielectric film 8A of completed electrode-foil 9A.

When the temperature of the solution is set in the range equal to or lower than 15° C., the content of fluorine present in the interface between second dielectric film 8B and first dielectric film 8A can be reduce to a value less than 5 atom %. Reducing the fluorine content can enhance the reliability such as corrosion resistant, of foil 9A, and reduce the environmental load at the time of disposal or decomposition treatment.

On the other hand, it is estimated that the thickness of first dielectric film 8A exceeds 10 nm when the temperature of the solution used in the electrolysis method or the electroless method exceeds 15° C. as shown in FIG. 5B. Thus, the capacity decreases as shown in FIG. 5A. When the temperature of the solution is in the range of 20° C. to 50° C., an oxide film (first dielectric film 8A) approximately 25 nm thick is formed under second dielectric film 8B. The content of fluorine present in the interface between second dielectric film 8B and first dielectric film 8A is as high as approximately 10 to 20 atom %.

The reason for the above phenomena is under consideration. The following assumption is considered. The high temperature of the solution used in the electrolysis method or the electroless method promotes chemical reactions in the solution. That is, on the condition that the temperature exceeds 15° C., oxygen dissolved in the solution reacts with foil 9B actively, and thus a thick oxide film (first dielectric film 8A) is formed before second dielectric film 8B is formed. Further, the reaction of fluorine in the solution with foil 9B is promoted, and thus foil 9B dissolves or fluorine remains on the surface of foil 9B.

In contrast, in this exemplary embodiment, it is considered that setting the temperature of the solution to 15° C. or lower in the electrolysis method or the electroless method can suppress the chemical reactions in the solution. This can reduce the thickness of first dielectric film 8A formed under second dielectric film 8B and reduce the content of fluorine present between second dielectric film 8B and first dielectric film 8A.

In this exemplary embodiment, the low temperature of the solution can suppress the reaction between fluorine and foil 9B, and elution of foil 9B. Especially, aluminum used as foil 9B oxidizes easily and is high reactive with fluorine, and thus causing the elution or the formation of first dielectric film 8A easily. Therefore, especially when aluminum is used as foil 9B, suppressing the reaction by lowering the solution temperature is effective.

As described above, the solution temperature can be adjusted in the range of −5° C. to 15° C. inclusive. At a temperature of approximately 15° C., it is possible that first dielectric film 8A thicker than that at 5° C. is formed, but the formation speed of second dielectric film 8B increases. This leads to enhancement of productivity. At a temperature equal to or lower than 10° C., the formation speed is low, but the thickness of second dielectric film 8B can be adjusted easily.

When electrode-foil 9A thus formed is used as a positive electrode-foil, recovery chemical conversion treatment may be performed as appropriate. For the chemical conversion, a 7% ammonium adipate aqueous solution at 70° C. is used on the conditions that the formation voltage is 4.5 V, the holding time is 20 minutes, and the chemical conversion current density is 0.05 A/cm$^2$, for example.

Next, the advantage of this exemplary embodiment is described with reference to an actual example. Two samples, Sample E1 and Sample C1, are fabricated. Sample E1 is electrode-foil 9A that includes first dielectric film 8A having a thickness of 5 nm and second dielectric film 8B having a thickness of 15 nm. Sample C1 is a conventional electrode-foil that includes a dielectric film formed by anodization only. Table 1 shows the results of comparison in physical property and characteristic between the two samples.

Table 1 shows the composition, the thickness, and the dielectric constant of each dielectric film, the diameter of the connection part between metallic fine particles 20, the capacity (capacitance) of each of the electrode-foils, and the LC value (leakage current value) of each of the electrode-foils. In order to clarify the difference between these samples, Table 1 shows the value when rough film layer 19 and the dielectric film are formed on one side of substrate 18. The thickness of rough film layer 19 in each sample is approximately 30 μm.

The thickness of each dielectric film is measured with various analyzing devices, such as a transmission electron microscope (TEM) and a scanning electron microscope (SEM).

The dielectric film of the electrode-foil of Sample C1 is fabricated in the following manner. After rough film layer 19 is formed by vapor deposition in a manner similar to that of electrode-foil 9A of Sample E1, chemical conversion is performed on the electrode-foil of Sample C1, using a 7% ammonium adipate aqueous solution at 70° C., on conditions that the formation voltage is 5 V, the holding time is 20 minutes, and the current density is 0.05 A/cm². The capacity of the electrode-foil is measured, using an LCR meter, in an 8% ammonium borate aqueous solution at 30° C. on conditions that the measurement area is 10 cm² and the measurement frequency is 120 Hz. The LC value is measured in the same solution and measurement area as those when the capacity is measured. The LC value shows the reading of the value of current flowing when a constant voltage is applied to the electrode-foil.

TABLE 1

|  |  | Sample E1 | Sample C1 |
|---|---|---|---|
| First dielectric film | Composition | Aluminum oxide | Aluminum oxide |
|  | Thickness (nm) | 5 | 10 |
|  | Dielectric constant | 10 | 10 |
| Second dielectric film | Composition | Titanium dioxide | (None) |
|  | Thickness (nm) | 15 | — |
|  | Dielectric constant | 40 | — |
| Diameter of connection part (μM) |  | 0.085 | 0.060 |
| Capacitance of foil (μF) |  | 2280 | 2000 |
| Leakage current of foil (μA) |  | 400 | 500 |

As obvious from Table 1, in electrode-foil 9A of Sample E1, the capacitance (capacity) is 280 μF larger and the LC value is 100 μA lower than those of the electrode-foil of Sample C1. In this manner, the configuration of this exemplary embodiment can increase the capacity and reduce the leakage current of capacitor 7 in comparison with those of the conventional example.

The above advantages can be obtained because dielectric film 8 is formed of a laminate of first dielectric film 8A made of a metal oxide of metallic fine particles 20 and second dielectric film 8B made of a metal compound different from the metal oxide of first dielectric film 8A. That is, although first dielectric film 8A is formed by oxidizing metallic fine particles 20, second dielectric film 8B is formed not by oxidizing the metallic fine particles but by laminating a different material on first dielectric film 8A. Therefore, when the dielectric constant of dielectric film 8, the withstand voltage, or the efficiency of the film-forming process is enhanced, the material of second dielectric film 8B can be selected freely among metallic materials different from those of metallic fine particles 20. Thus, the capacity of capacitor 7 can be increased easily.

As shown in Table 1, the dielectric constant of aluminum oxide that is used as a dielectric film of Sample C1 is 10, and the capacitance of the electrode-foil of Sample C1 is 2000 μF. In contrast, in Sample E1, first dielectric film 8A made of an aluminum oxide film is formed thin, and second dielectric film 8B made of titanium dioxide that has a large dielectric constant ($\in=40$) is laminated thereon. This configuration can increase the capacitance to 2280 μF.

Furthermore, in this exemplary embodiment, since first dielectric film 8A is covered with second dielectric film 8B, the formation time of first dielectric film 8A is short. This can reduce the level at which first dielectric film 8A erodes the inside of metallic fine particles 20. Further, since second dielectric film 8B has a large dielectric constant, even the second dielectric film formed thick can maintain large capacitance. In this manner, second dielectric film 8B reinforces the outer periphery (surfaces) of metallic fine particles 20, thereby suppressing defects. As a result, the capacity of capacitor 7 can be increased, and the leakage current can be reduced.

Connection part 21 between metallic fine particles 20 is constricted, and breaks easily. However, in this exemplary embodiment, second dielectric film 8B is formed on the outer periphery (surface) of constricted connection part 21. This configuration can further suppress the defects of metallic fine particles 20. As shown in Table 1, in Sample E1, the diameter of constricted connection part 21 is 0.085 μm, which is thicker than a diameter of 0.060 μm in Sample C1. Thus, the configuration of this exemplary embodiment can suppress the defects in rough film layer 19.

In this exemplary embodiment, rough film layer 19 is a coarse structure of 20 μm or greater in thickness where a large number of holes each having a diameter of 0.20 μm or less is formed. This structure can increase the capacity but breaks more easily. Since first dielectric film 8A is also formed inside metallic fine particles 20, when first dielectric film 8A is formed thick, the mechanical strength decreases. In contrast, in this exemplary embodiment, first dielectric film 8A is formed thin, and second dielectric film 8B is formed so as to cover the outer surface of first dielectric film 8A. This configuration can increase the mechanical strength and capacity, and reduce the leakage current.

In the case of capacitor 7, for example, where a solid conductive polymer is used as an electrolyte, if metallic fine particles 20 have defects and the metal surfaces are exposed, dielectric film 8 cannot be recovered. Therefore, as shown in this exemplary embodiment, enhancing the mechanical strength of rough film layer 19 using second dielectric film 8B is extremely effective in reducing the leakage current and increasing the withstand voltage of the electrolytic capacitor.

Dielectric film 8 may be formed, by physical vapor deposition, sputtering, chemical vapor deposition, or the like, in a dry atmosphere. However, in such a dry method, it is difficult to form uniform dielectric film 8 in rough film layer 19 made of a structure including a plurality branches. Thus, dielectric film 8 is likely to be discontinuous. Therefore, a wet plating method where second dielectric film 8B is formed in a liquid is preferable. The wet method enables a uniform film to be formed easier than the dry method. Further, in this exemplary embodiment, second dielectric film 8B is formed by the wet method. Thus, the film can be formed continuously even on the outer surface of constricted connection part 21 where metallic fine particles 20 connect to each other. Thereby, the leakage current can be reduced.

The wet methods include various methods, such as a liquid phase deposition (LPD) method, sol-gel method, and plating method. Especially by an electrolytic plating method among plating methods, second dielectric film 8B can be formed on conductive metallic fine particles 20 in rough film layer 19 of any stereoscopic structure. Thus, more continuous second dielectric film 8B can be formed with a uniform thickness. Second dielectric film 8B may also be formed in the following manner. A metal not included in the major components of metallic fine particles 20 is formed by the plating method, and thereafter the deposited metal is anodized, for example.

According to a componential analysis, when second dielectric film 8B is formed by the LPD method, fluorine remains in second dielectric film 8B as an impurity. Similarly, in the sol-gel method, carbon remains. In the plating method, elements such as nitrogen and carbon remain. In the wet method, the ratio of hydroxide mixed into second dielectric film 8B is higher than that in the dry method. The wet method used in this exemplary embodiment needs facilities simpler than those in the dry method, thus reducing the production cost.

Rough film layer 19 has a structure where metallic fine particles 20 connected together so as to have a plurality of branches. However, a structure where metallic fine particles 20 grow so as to pile up in columnar shapes may be used. Alternatively, rough film layer 19 may be formed of a compact structure where blocks pile up. Also in these structures, the wet method can form continuous uniform second dielectric film 8B efficiently.

Since first dielectric film 8A is formed under second dielectric film 8B, the leakage current can be suppressed even when second dielectric film 8B delaminates.

Since first dielectric film 8A is an oxide film of metallic fine particles 20, the adhesion between dielectric film 8 and metallic fine particles 20 is higher than that when second dielectric film 8B is laminated directly on the surfaces of metallic fine particles 20. This configuration contributes to the decrease in the leakage current.

Since both of first dielectric film 8A and second dielectric film 8B are oxides, these two films have relatively high affinity. Thus, the adhesion between these films is higher than that when second dielectric film 8B is laminated directly on the surfaces of metallic fine particles 20. This configuration can further reduce the leakage current.

In this exemplary embodiment, a laminated solid electrolytic capacitor is used as an example. However, the present invention may be applied to a wound solid electrolytic capacitor, and an electrolytic capacitor including an electrolytic solution. In either case, when electrode-foil 9A is used as a positive electrode-foil, a capacitor having a large capacity can be fabricated. Furthermore, the mechanical strength of rough film layer 19 can be enhanced and the leakage current can be reduced.

In this exemplary embodiment, rough film layer 19 is formed by vapor deposition. Rough film layer 19 may be formed by etching the flat surface of the substrate.

Second Exemplary Embodiment

Figure 6:
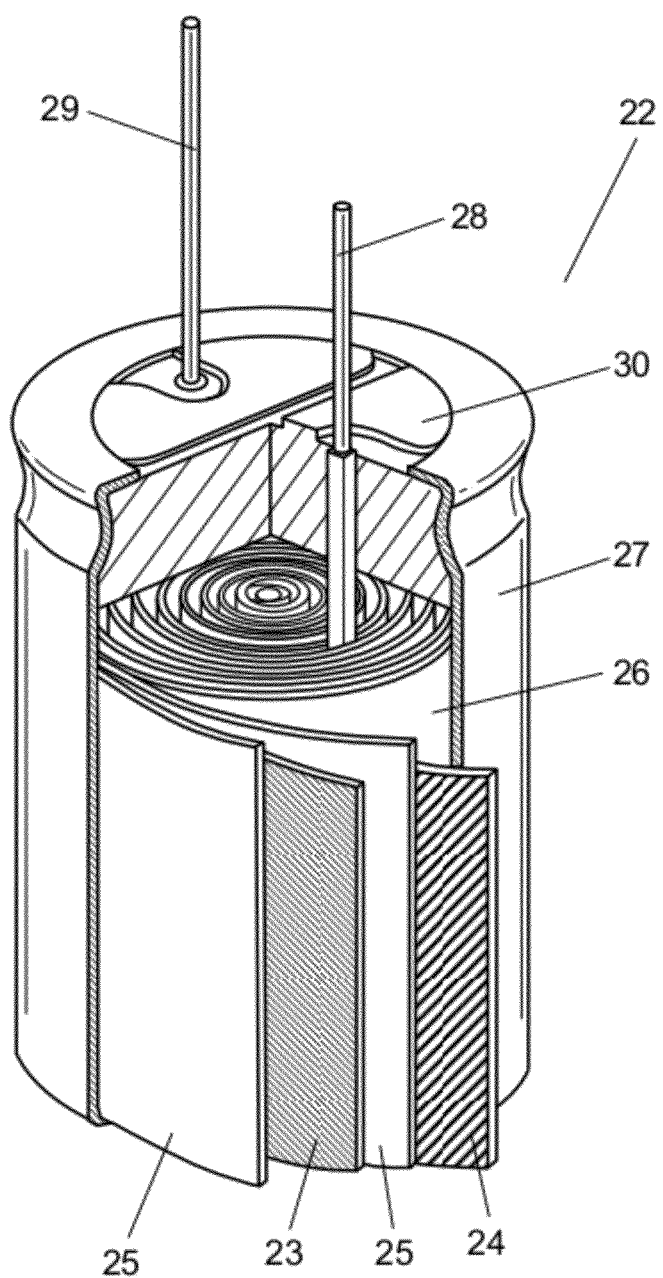
FIG. 6 is a partially cutaway view in perspective of a capacitor in accordance with a second exemplary embodiment of the present invention.

FIG. 6 is a partially cutaway view in perspective of a capacitor in accordance with a second exemplary embodiment of the present invention. Capacitor 22 of this exemplary embodiment is an electrolytic capacitor including a liquid electrolytic solution as a negative electrode material. Capacitor 22 includes capacitor element 26, an electrolytic solution impregnated in capacitor element 26, case 27, positive electrode terminal 28, negative electrode terminal 29, and sealing material 30.

Capacitor element 26 is formed in the following manner. Positive electrode-foil 23 and negative electrode-foil 24 are opposed to each other with separator 25 interposed therebetween, and are wound. Case 27 accommodates capacitor element 26 and the electrolytic solution. Positive electrode terminal 28 is electrically connected to positive electrode-foil 23 and electrically leads positive electrode-foil 23 to the outside of case 27. Negative electrode terminal 29 is electrically connected to negative electrode-foil 24 and electrically leads negative electrode-foil 24 to the outside of case 27. Positive electrode terminal 28 and negative electrode terminal 29 are inserted in sealing material 30. Sealing material 30 seals an opening of case 27.

Negative electrode-foil 24 is identical in configuration with electrode-foil 9A of the first exemplary embodiment described with reference to FIG. 3A and FIG. 3B. That is, negative electrode-foil 24 includes substrate 18, rough film layer 19, first dielectric film 8A, and second dielectric film 8B. Substrate 18 and rough film layer 19 are made of aluminum. Rough film layer 19 is formed on substrate 18. First dielectric film 8A made of aluminum oxide is formed on the surface of rough film layer 19 by chemical conversion. Second dielectric film 8B made of titanium dioxide is laminated on first dielectric film 8A by a wet method. Second dielectric film 8B is disposed on the side opposite separator 25.

The materials of negative electrode-foil 24 are not limited to the above, and can be selected among various conductive materials, similarly to the first exemplary embodiment. In the step of forming second dielectric film 8B, the temperature of the plating solution is set equal to or lower than 15° C. in a manner similar to that of the first exemplary embodiment. Thereby, first dielectric film 8A is formed so as to have a thickness greater than 0 nm and less than 10 nm. Negative electrode-foil 24 of this exemplary embodiment is fabricated in a manner substantially similar to that of electrode-foil 9A of the first exemplary embodiment. Thus, the description is omitted.

Similarly to the first exemplary embodiment, rough film layer 19 has a coarse (porous) structure formed by vapor deposition where metallic fine particles 20 irregularly are connected together and extend from the surface of the substrate and forms a plurality of branches. The electrode-foil that includes rough film layer 19 having a large surface area is used as negative electrode-foil 24. Thereby, the capacity can be increased. By using titanium dioxide having a dielectric constant larger than that of first dielectric foil 8A, the capacity can be further increased.

Next, a description is provided for the advantage of this exemplary embodiment with reference to an actual example. That is, Sample E2 and Sample C2 are fabricated. In Sample E2, electrode-foil 9A that includes first dielectric film 8A having a thickness of 2 nm and second dielectric film 8B having a thickness of 6 nm is used as negative electrode-foil 24. In Sample C2, a conventional electrode-foil that includes a dielectric film formed by anodization only is used as negative electrode-foil 24. Table 2 shows the results of comparison in physical property or characteristic between the two samples. In each of Sample E2 and Sample C2, the rough film layer and the dielectric film are formed on one side of the electrode-foil.

TABLE 2

| | | Sample E2 | Sample C2 |
|---|---|---|---|
| First dielectric film | Composition | Aluminum oxide | Aluminum oxide |
| | Thickness (nm) | 2 | 4 |
| | Dielectric constant | 10 | 10 |
| Second dielectric film | Composition | Titanium dioxide | (None) |
| | Thickness (nm) | 6 | — |
| | Dielectric constant | 40 | — |
| Capacitance of foil (μF) | | 5500 | 5000 |

As obvious form Table 2, Sample E2 has a capacitance of electrode-foil 9A is 5500 μF, which is 500 μF larger than that of Sample C2.

The capacitive component of negative electrode-foil 24 and the capacitive component of positive electrode-foil 23 are connected in series. Thus, it is preferable that no dielectric film is formed on negative electrode-foil 24 so as to generate no capacitive component on the negative electrode side. It is also preferable to form capacitor 7 such that the capacitance of positive electrode-foil 23 is high. However, actually, an oxide film is formed on negative electrode-foil 24 by natural oxidation, heat treatment, or the like. In order to control the formation of the oxide film, an oxide film is formed on the surface of negative electrode-foil 24 in advance in some cases. When negative electrode-foil 24 is made of aluminum, chemical conversion is performed at approximately 2V. Therefore, forming dielectric film 8 having a high dielectric constant on negative electrode-foil 24 in advance is effective in increasing the capacity of capacitor 7. Further, when dielectric film 8 (second dielectric film 8B) is made of titanium dioxide, for example, the degradation of the surface of the negative electrode can be suppressed.

In this exemplary embodiment, electrode-foil 9A that includes rough film layer 19 having a large surface area is used as negative electrode-foil 24. However, electrode-foil 9A may be used as positive electrode-foil 23, or electrode-foils 9A may be used as both negative electrode-foil 24 and positive electrode-foil 23. In either case, this configuration contributes to the increase in the capacity of electrode-foil 9A and the mechanical strength of rough film layer 19, and to the decrease in the leakage current.

However, when electrode-foil 9A is used for capacitor 22, a positive voltage is applied to the positive electrode-foil 23 side. Thus, when electrode-foil 9A is used as positive electrode-foil 23, laminated second dielectric film 8B can be delaminated by the voltage application. In recovery chemical conversion, delamination occurs with a higher possibility. Application of a positive voltage can chemically convert the metallic fine particles under first dielectric film 8A, thus reducing the capacitance. Thus, as shown in this exemplary embodiment, it is preferable to use electrode-foil 9A having second dielectric film 8B as negative electrode-foil 24 in terms of stability of the products.

In this exemplary embodiment, similarly to the first exemplary embodiment, covering the outer surface of rough film layer 19 with thick second dielectric film 8B can enhance the mechanical strength of rough film layer 19 and suppress the defects. Thus, electrode-foil 9A having a large surface area can be produced in a stable manner.

In this exemplary embodiment, an electrolytic solution is impregnated in capacitor element 26. Instead of the electrolytic solution, a solid electrolyte containing a conductive polymer, an organic semiconductor material, or the like may be used. These materials may be impregnated in capacitor element 26 before or after the electrode-foils and separator 25 are wound so as to form capacitor element 26.

In the first and second exemplary embodiments, a description is provided for the electrodes of a capacitor as an example. Besides, when second dielectric film 8B is made of titanium dioxide, a conductive glass or aluminum is used as substrate 18, and a dye of a ruthenium complex and an electrolyte is used, for example, the electrode-foil can be used as the electrode for a dye-sensitized solar cell or the like.

In the case where a substance other than a metal is used as the substrate, a coarse or compact metal layer like rough film layer 19 is formed on the surface of the substrate and first dielectric film 8A is formed of a metal oxide of the metal of this metal layer.

When second dielectric film 8B is made of titanium dioxide, the electrode-foil of the present invention can also be used for antimicrobial, deodorizing, water-purifying articles that make use of the function of decomposing organic matter or hazardous substances, which is provided by the photocatalyst action of titanium dioxide.

In this case, since the surface area is increased by rough film layer 19, the antimicrobial, deodorizing, water-purifying functions can be enhanced. Furthermore, since rough film layer 19 has a high mechanical strength, applications having high reliability can be achieved. The electrode-foil of the present invention can also be used as various electrodes for a gas sensor, for example.

Industrial Applicability

The electrode-foil of the present invention allows a reduction in the thickness of a small electrolytic capacitor having a large capacity, a small leakage current and a high withstand voltage. The electrode-foil of the present invention has a high mechanical strength, and can be used in applications requiring high reliability.

The invention claimed is:

1. An electrode-foil comprising:
    a foil having a metal layer on a surface thereof and including a substrate and a rough film layer formed on the substrate;
    a first dielectric film composed of a metal oxide of a metal constituting the metal layer, formed on the metal layer, and having a thickness greater than 0 nm and less than 10 nm; and
    a second dielectric film predominantly composed of a metal compound different from the metal oxide of the first dielectric film, and formed on the first dielectric film.

2. The electrode-foil according to claim 1, wherein:
    the substrate is made of metal, and
    the rough film layer is formed of a plurality of metallic fine particles irregularly connected together and extending from a surface of the substrate, and has a large number of holes inside the layer.

3. The electrode-foil according to claim 2, wherein
    the first dielectric film and the second dielectric film are formed on an outer surface of each of the metallic fine particles, and
    a connection part between the plurality of metallic fine particles is constricted, and the first dielectric film and the second dielectric film are formed also on an outer surface of the connection part.

4. The electrode-foil according to claim 2, wherein the rough film layer has a structure including a plurality of branches.

5. The electrode-foil according to claim 2, wherein
    the first dielectric film is formed on an inside and an outer surface of each of the metallic fine particles by oxidation of the metallic fine particles, and
    the second dielectric film is formed on an outer surface of the first dielectric film so as to reinforce a mechanical strength of the first dielectric film.

6. The electrode-foil according to claim 2, wherein a mode of diameters of the holes in the rough film layer ranges from 0.01 μm to 0.20 μm inclusive.

7. The electrode-foil according to claim 1, wherein the second dielectric film is made of a material that has a dielectric constant greater than that of the oxide constituting the first dielectric film.

8. An electrode-foil comprising:
    a foil having a metal layer on a surface thereof;
    a first dielectric film composed of a metal oxide of a metal constituting the metal layer, formed on the metal layer, and having a thickness greater than 0 nm and less than 10 nm; and
    a second dielectric film predominantly composed of a metal compound different from the metal oxide of the first dielectric film, and formed on the first dielectric film,
    wherein a content of fluorine in an interface between the first dielectric film and the second dielectric film is less than 5 atom %.

9. A manufacturing method for an electrode-foil, comprising:
forming, on a metal layer formed on a surface of a foil, a first dielectric film composed of a metal oxide of a metal constituting the metal layer; and
forming a second dielectric film predominantly composed of a metal compound different from the metal oxide of the first dielectric film and suppressing a thickness of the first dielectric film to a value less than 10 nm by one of an electrolysis method and an electroless method with the foil that has the first dielectric film formed thereon immersed in a solution at a temperature equal to or lower than 15° C.

10. A capacitor comprising:
a capacitor element including an positive electrode part and a negative electrode part;
an electrolyte interposed between the positive electrode part and the negative electrode part; and
an outer package housing the capacitor element and the electrolyte,
wherein at least one of the positive electrode part and the negative electrode part includes:
a foil having a metal layer on a surface thereof;
a first dielectric film composed of a metal oxide of a metal constituting the metal layer, formed on the metal layer, and having a thickness greater than 0 nm and less than 10 nm; and
a second dielectric film predominantly composed of a metal compound different from the metal oxide of the first dielectric film, and formed on the first dielectric film.

* * * * *